US012140503B2

(12) United States Patent
Hill et al.

(10) Patent No.: US 12,140,503 B2
(45) Date of Patent: Nov. 12, 2024

(54) LEAK DETECTION SYSTEM

(71) Applicant: Plastic Omnium Advanced Innovation and Research, Brussels (BE)

(72) Inventors: David Hill, Brussels (BE); Antoine Chaussinand, Brussels (BE); Mihai Baja, Brussels (BE)

(73) Assignee: Plastic Omnium Advanced Innovation and Research, Brussels (BE)

( * ) Notice: Subject to any disclaimer, the term of this patent is extended or adjusted under 35 U.S.C. 154(b) by 269 days.

(21) Appl. No.: 17/780,386

(22) PCT Filed: Nov. 30, 2020

(86) PCT No.: PCT/EP2020/083834
§ 371 (c)(1),
(2) Date: May 26, 2022

(87) PCT Pub. No.: WO2021/105493
PCT Pub. Date: Jun. 3, 2021

(65) Prior Publication Data
US 2023/0008799 A1    Jan. 12, 2023

(30) Foreign Application Priority Data

Nov. 29, 2019    (EP) ..................................... 19212718

(51) Int. Cl.
*G01M 3/02*    (2006.01)
*B60K 15/035*    (2006.01)
(Continued)

(52) U.S. Cl.
CPC ....... *G01M 3/025* (2013.01); *B60K 15/03504* (2013.01); *G01L 27/007* (2013.01); *G01M 3/3263* (2013.01); *B60K 2015/03538* (2013.01)

(58) Field of Classification Search
CPC ................ G01M 3/025; G01M 3/3263; B60K 15/03504; B60K 2015/03538; B60K 2015/03552; B60K 15/03; G01L 27/007
See application file for complete search history.

(56) References Cited

U.S. PATENT DOCUMENTS

2015/0019066 A1    1/2015    Dudar et al.
2015/0158378 A1    6/2015    Dudar et al.

FOREIGN PATENT DOCUMENTS

EP    2960092 A1 *  12/2015  ............. B60K 15/03
EP    3 409 936 A1   12/2018
(Continued)

OTHER PUBLICATIONS

International Search Report issued Dec. 22, 2020 in PCT/EP2020/083834 filed on Nov. 30, 2020, 3 pages.

*Primary Examiner* — David Z Huang
(74) *Attorney, Agent, or Firm* — Oblon, McClelland, Maier & Neustadt, L.L.P.

(57) ABSTRACT

The invention relates to a leak detection system on board of a vehicle comprising a fuel tank (301, 401), a filler pipe (302, 402), a venting line (303, 403) for recirculating fuel vapors from the tank to the filler pipe, said system having a combination pressure and temperature sensor mounted in the vapor dome of the fuel tank, and a pressure sensor located in the recirculation line above the highest possible liquid level that could be present in the recirculation line and to methods to detect said leak.

15 Claims, 3 Drawing Sheets

(51) Int. Cl.
*G01L 27/00* (2006.01)
*G01M 3/32* (2006.01)

(56) References Cited

FOREIGN PATENT DOCUMENTS

| | | | | |
|---|---|---|---|---|
| JP | 2012036769 A | * | 2/2012 | |
| JP | 2015-096710 A | | 5/2015 | |
| JP | 2015-096711 A | | 5/2015 | |

* cited by examiner

LEAK DETECTION SYSTEM

CROSS-REFERENCE TO RELATED APPLICATIONS

The present application is a 35 U.S.C. § 371 national stage application of International patent application PCT/EP2020/083834, filed Nov. 30, 2020, which is based on and claims the benefit of priority to European Application No. 19212718.1, filed Nov. 29, 2019. The entire contents of these applications are incorporated herein by reference.

The invention relates to a sealed fuel system for a vehicle comprising a leak detection device. The invention further relates to a method for detecting a leak in a sealed fuel system of a vehicle and a method for detecting a malfunctioning of a pressure sensor in a sealed fuel system for a vehicle.

Current leak detection systems are required to detect a leak in the complete evaporative emission system of a sealed fuel system, which includes any component internally exposed to fuel vapor. More specifically leak detection systems, which are able to detect and find small leaks within a sealed fuel system and signal the vehicle owner to take the vehicle for repair of the system, in order to reduce the amount of volatile organic compounds present in the environment. Typically, the leak detection systems and methods in the market work in two basic ways. The first is a method that induces pressure or vacuum in the interior of the sealed fuel system components via a mechanical pump, said method is called "active leak detection method". The second is a method that relies on the evolution of temperature to build pressure inside the fuel tank based on the principle of the ideal gas law that relates a change in temperature in a sealed fuel system to a change in pressure in said system as a function of the amount of temperature change and the gas properties of the gaseous mixture inside the tank, said method is called "passive leak detection method". The second method presents the advantage of being much less costly and requires significantly less power consumption while a vehicle is off however it generally generates less pressure and/or vacuum than a system using a pump. Specifically in the prior art there exists solutions in which temperature is measured in addition to pressure inside the fuel vapor dome in order to related the two basic ways and determine whether there is a leak present. For example if there is 3 degrees temperature evolution, it is deemed that there should indeed be measurable pressure evolution inside the tank provided there is not a leak. Nevertheless, those systems and methods to detect a leak require a good communication of the vapor phase between all parts of the sealed fuel system.

Unfortunately, it is impossible for the existing leak detection devices and methods to perform a leak detection in a fuel system having a venting line that geometrically creates an isolated low point or a sump. Liquid fuel may be present in the sump and blocks the vapor circulation inducing a risk that a leak as big as a missing filler cap would never be detected if the venting line going to the filler pipe to provide vapor communication is blocked.

There is thus a need to improve the existing leak detection devices and methods for detecting a leak in a sealed fuel system having a venting line forming a sump that is more accurate than prior art techniques but also methods for detecting a malfunctioning of a pressure sensor in a sealed fuel system of a vehicle and finally a need of fuels systems which are easy to manage from a leak detection perspective.

It is a first object of the invention to provide a sealed fuel system for a vehicle comprising a leak detection device, said sealed fuel system being easy to manage from a leak detection perspective and easy to install in the vehicle frame.

According to a first embodiment of the invention, the sealed fuel system for a vehicle comprising a fuel tank, a filler pipe, a venting line for recirculating fuel vapors from the tank to the filler pipe and a leak detection device, wherein the leak detection device comprises:
 a first pressure sensor provided to measure the pressure in the vapor dome of the fuel tank,
 a second pressure sensor, and
 a controller,
 the sealed fuel system being characterized in that:
 the filler pipe has a sealing means located near the fuel tank,
 a part of the venting line forms a sump, and
 the second pressure sensor is provided to measure the pressure in the venting line above the highest possible liquid level that could be present in the venting line or to measure the pressure in the filler pipe above the highest possible liquid level that could be present in said filler pipe.

Advantageously, the leak detection device according to the invention permits the use of venting line having a sump shape in a sealed fuel system, which leads to a simplified assembly procedure of the fuel system in the vehicle during the production line. Furthermore, additional holes drilled in the vehicle frame to pass the venting line are unnecessary which can add weight due to additional reinforcement pieces to counteract decreases in stiffness from the resulting holes. Finally, two pressure sensors enables to detect a leak if vehicle-operating condition can create unconnected vapor volumes in the fuel system, said unconnected volumes being the vapor dome of the tank and the top of the filler pipe or the vapor dome of the tank and the top of the venting line. For optimized filling performance, usually the filler pipe is usually connected at the bottom of the fuel tank and in most situations; the fuel in the tank will fill the connection between them. Additionally the sealing means has a normally closed position. The role of the venting line is to ensure a secondary connection, but the vapor disconnection will come from liquid fuel in the sump between the two volumes. The liquid can ingress inside the sump due to dynamic vehicle conditions during driving or due to slow filling of the venting line if the vehicle is parked in an inclined configuration. By the expression "sealed fuel system", we intend to mean that the openings of the fuel system are normally closed. By the term "controller", we intend to mean an electronic control unit (ECU).

According to a preferred embodiment, the first pressure sensor is mounted in the vapor dome of the fuel tank.

According to a preferred embodiment, the second pressure sensor is located in the venting line above the highest possible liquid level that could be present in the venting line or is located in the filler pipe above the highest possible liquid level that could be present in said filler pipe.

According to a preferred embodiment, the second pressure sensor is located in the venting line between the sump and the top of the filler pipe, above the highest possible liquid level that could be present in the venting line.

According to a preferred embodiment, the sealing means is an Inlet Check Valve. In an example, the Inlet Check Valve is a one-way check valve that is a sealing valve that allows creating a seal between the fuel tank and the filler pipe for preventing pressure built in the fuel tank from being transferred into the filler pipe.

According to a preferred embodiment, the leak detection device comprises a temperature sensor provided to measure the temperature in the vapor dome of the fuel tank.

The presence of the temperature sensor enables the increase of the conditions where the leak detection can be performed by reducing the thresholds for detection. Through the ability to measure the temperature inside the vapor dome of the fuel tank, a better prediction of the resulting pressure change between two measurement time points through the use of pressure/temperature relationships. Furthermore, by placing the temperature sensor in the vapor dome of the tank it is likely that the temperature change is lower than the temperature change in the filler pipe, meaning it gives a conservative indirect measurement of the temperature inside the filler pipe. Like this, a filler pipe threshold pressure Th3 can also be lowered. This is especially advantageous as there is direct relation of the performance of a passive leak detection system to a threshold pressure required Th2.

According to a preferred embodiment, the temperature sensor is mounted in the vapor dome of the fuel tank.

According to a preferred embodiment, the sealed fuel system for a vehicle according to the invention, is such that the part of the venting line forming a sump has a shape selected from the group consisting of a U-shape, a V-shape and a J-shape, preferably the part of the venting line forming a sump has a J-shape.

The different shapes of the sump permits a higher fuel systems adaptability to different vehicle architectures. The J-shape is preferred to improve refueling performance. The venting line connecting the filler pipe to the tank has a higher length on the filler pipe side than on tank side. The highest point of the filler pipe is generally higher than the highest point of the tank relative to a horizontal ground (highest in the Z direction once installed in the vehicle); it reduces fuel going out of the filler pipe at the end of a refueling event.

It is a second object of the invention to provide a method for detecting a leak in a sealed fuel system of a vehicle, said sealed fuel system having a venting line having a sump shape.

According to a preferred embodiment of the invention, the method is provided for detecting a leak in a sealed fuel system of a vehicle as defined above.

According to a preferred embodiment of the invention, the method for detecting a leak in a sealed fuel system of a vehicle comprising a fuel tank, a filler pipe, a venting line for recirculating fuel vapors from the tank to the filler pipe, wherein a part of the venting line forms a sump, is such that said method comprising at least the steps of:
  a) measuring and storing the pressure P1, and if needed the temperature, in the vapor dome of a tank of the fuel tank at predetermined time points;
  b) measuring the pressure P2 in the filler pipe of the fuel system or in the venting line of the fuel system above the highest possible liquid level that could be present in the venting line or in the filler pipe at predetermined time points;
  c) comparing the pressure value P1 in the vapor dome of a tank of the fuel tank and the pressure value P2 in the filler pipe of the fuel system or in the venting line of the fuel system above the highest possible liquid level at the same pre-determined time point that could be present in the venting line or in the filler pipe;
  d) detecting a leak using the result obtained on step c).

The method for detecting a leak in a sealed fuel system of a vehicle according to the invention permits to obtain reliable results even if the vapor dome of the fuel tank and the top of the filler pipe or the top of the venting line are not in direct communication. By "direct communication", we intend to mean that there is a continuous gas flow in the venting line and no or a very small quantity of liquid that does not block the gas flow is present. Moreover, the method according to the invention is exhaustive in covering all vehicle life situations that can produce different situation inside the fuel system: situations where the pressure evolves similarly or differently in the vapor dome of the fuel tank and in the top of the venting line or the top of the filler pipe. These situations can be generated by the drive condition of the vehicle (whether the environment of the fuel system is hot or not), by the positioning of the vehicle during the parking (inside, outside, in direct sunlight, in shadow completely or partially) and by other environmental elements during the parking phase (wind convection around the fuel tank, external temperature evolution, etc.). The predetermined time points for measuring the pressure in the vapor dome of the fuel tank are preferably 0.5, 2, 3, 6, 8, 10, 12 and 24 hours after the vehicle is key-off.

According to a preferred embodiment, the method for detecting a leak in a sealed fuel system of a vehicle according to the invention is such that the step c) and d) comprise the steps of:
  e) comparing the absolute value of the difference between the two measured pressures P1, P2 to a first threshold Th1;
  f) if the absolute value of the difference is lower than the first threshold Th1, comparing temperatures and pressures in the vapor dome of the fuel tank measured at the predetermined time points;
  g) if the difference of the temperatures measured at a first time and at a second later time is higher than a temperature threshold Th5, Calculating a pressure Ppredicted expected in the fuel system at the second time, on the basis of the temperatures evolution measured between the first time and at the second time and the pressure obtained at the first time, and a coefficient that represents the natural evolution of pressure in the fuel system over time;
  h) detecting a leak by comparing the calculated expected pressure and the pressure obtained at the second time to at least one predetermined second threshold Th2.

The method permits to detect a leak in the case of the pressures in the vapor dome of the tank and in the top of the filler pipe or in the top of the venting line evolve similarly. The principle of the method relies on the pressure and the temperature evolution in the vapor dome to detect a leak in the system. By evolution, we intend to mean that there are several measurements of the couple pressure/temperature catching the change in temperature and pressure. In the state of the art, the algorithm shows that the relation between pressure and temperature can be predicted as disclosed in document EP 3 409 936 A1. If the pressure difference is lower than Th1, it means that possibly there is no liquid in the venting line connecting the tank to the filler pipe. In such a case, the analysis can rely only on one pressure sensor, which reduces the needs in term of accuracy on the second sensor, thus reducing its cost. The electrical consumption can also be reduced, as the second sensor can be unpowered for ulterior pressure measurements.

According to a preferred embodiment, which is an alternative to the previous one, the method for detecting a leak in a sealed fuel system of a vehicle according to the invention, wherein steps c) and d) comprise the steps of: i) comparing the absolute value of the difference between the two measured pressures P1, P2 to the first threshold Th1;

j) if the absolute value of the difference is higher than the first threshold Th1, comparing the absolute value of the pressure in the vapor dome of a tank of the fuel system P1 to a third threshold Th3 and comparing the absolute value of the pressure in the filler pipe of the fuel system P2 or in the venting line of the fuel system P2 above the highest possible liquid level that could be present in the venting line or in the filler pipe to a fourth threshold Th4;

k) if the absolute value of the pressure in the vapor dome of a tank of the fuel system P1 is lower than the third threshold Th3, concluding to the impossibility to detect a leak;

l) if the absolute value of the pressure in the filler pipe of the fuel system P2 or in the venting line of the fuel system P2 above the highest possible liquid level that could be present in the venting line or in the filler pipe is higher than a fourth threshold Th4 concluding the system is leak tight;

m) if the absolute value of the pressure in the filler pipe of the fuel system P2 or in the venting line of the fuel system P2 above the highest possible liquid level that could be present in the venting line or in the filler pipe is lower than the fourth threshold concluding the system has a leak.

The method permits to detect a leak in the case of the pressures in the vapor dome of the tank and in the top of the filler pipe or in the top of the venting line evolve differently (the difference between the two pressures is higher than Th1). In such a case, there is possibly liquid in the venting line connecting the vapor dome of the fuel tank and the top of the filler pipe. As there is a doubt on the presence of liquid in the venting line sump or the presence of a leak, the method has advanced steps to avoid falsely predicting a leak. The presence of the liquid in the venting line can be assessed with the pressure in the vapor dome of the fuel tank, if the absolute pressure is higher than Th3, the gas pressure would have been able to push (in case of a positive relative pressure) or to aspire (in case of a negative relative pressure) the liquid from the venting line to the filler pipe or into the tank. In this case, a full or partial gas connection between the vapor dome of the fuel tank and the filler pipe can be considered. By "a full connection", we intend to mean that all the liquid in the line has been pushed or aspired in the filler pipe or the fuel tank. In case of a partial gas connection, we intend to mean that some bubbles can go through the liquid between the tank and the filler pipe. If the pressure criteria is not met, this step of the method allows the disabling of the algorithm and thus reduce electrical consumption of the control unit. In the case of the pressure in the tank is higher than Th3, the method compares the pressure in the filler pipe to Th4. In this case, a lower value than the threshold indicates that a full or partial gas connection does not lead to a pressure equilibrium between the two volumes so there is a leak in the system on the filler pipe side.

According to a preferred embodiment, the method for detecting a leak in a sealed fuel system of a vehicle according to the invention is such that the first threshold Th1 is defined taking into account the precision and the accuracy of the two pressure sensors.

Th1 is the maximum difference acceptable between the two sensors when they are measuring the same actual pressure. This threshold cumulates the precision and the accuracy of the two sensors plus a safety margin. The margin is comprised in the range of 1 to 10 mbar, preferably in the range from 1 to 5 mbar. The individual accuracy and precision of a sensor can be technologically reduced, but it increases the cost of the sensor. There is thus a compromise to be made between the cost and the efficiency of the sensor. A preferred sensor would have a precision between 1 to 5 mbar, preferably equal 2 mbar, and an accuracy between 0.5 to 3 mbar, preferably equal to 1 mbar. Therefore, Th1 would be comprised between 4 mbar and 26 mbar, preferably comprised between 5 and 10 mbar.

According to a preferred embodiment, the method for detecting a leak in a sealed fuel system of a vehicle according to the invention is such that the second threshold Th2 is chosen in the range of 5 mbar and 35 mbar and the temperature threshold Th5 is chosen between 1° C. and 5° C., preferably between 2° C. and 3° C.

According to a preferred embodiment, the method for detecting a leak in a sealed fuel system of a vehicle according to the invention is such that the third threshold (Th3) is adapted to the potential maximum hydraulic pressure of the liquid in the sump part of the venting line in function of the sign of the value of the pressure in the fuel tank vapor dome.

The third threshold Th3 is the pressure needed to push or aspire the liquid from the sump. In case the pressure in the fuel tank vapor dome is higher than the pressure in the filler pipe, the liquid in the venting line will be pushed in the filler pipe. In case of the venting line has a J-shape with the top of the filler pipe higher than the top of the tank, Th3 is the hydraulic pressure equivalent to the sump volume when all the liquid is in the highest length of the connecting line (of J) and the liquid density. This value is directly driven by the design of the vehicle. A common value for instance could be 40 mbar. In case of the pressure in the fuel tank vapor dome is lower than the pressure in the filler pipe (for instance in case of relative vacuum with regard to the ambient pressure outside of the fuel system), the liquid in the venting line will be aspired in the fuel tank. In the case of the connecting line has a J-shape with the top of the filler pipe higher than the top of the tank, Th3 is the hydraulic pressure equivalent to the liquid density and the volume between the lowest level of the sump and the top of the tank height. This value is directly driven by the design of the vehicle. A common value for instance could be 20 mbar. The adjustment of Th3 to the fact that the liquid in the sump will be pushed or aspired regarding the pressure difference allows reducing the pressure needed in the tank. It further allows taking a quicker decision and thus reducing electrical consumption and increasing the occurrence of the decision.

According to a preferred embodiment, the method for detecting a leak in a sealed fuel system of a vehicle according to the invention is such that the fourth threshold Th4 is defined relatively to the sensor accuracy and precision of the pressure sensor located in the venting line above the highest possible liquid level that could be present in the venting line or located in the filler pipe above the highest possible liquid level that could be present in said filler pipe.

The fourth threshold Th4 is the minimal detectable pressure that can be maintained by the fuel system if a leak is not present. For pressures lower than this threshold, a situation where a leak is present cannot be distinguished from a situation where no leak is present due to the volatile nature of the fuel. This value takes into account sensor accuracy and precision plus a safety margin. The margin is between 1 to 10 mbar, preferably 1 to 5 mbar. A preferred sensor would have a precision between 1 to 5 mbar, preferably 2 mbar and an accuracy between 0.5 to 3 mbar preferably 1 mbar. Therefore, Th4 preferred value would be 10 mbar.

According to a preferred embodiment, the method for detecting a leak in a sealed fuel system of a vehicle according to the invention is such that the third and the fourth threshold Th3, Th4 are augmented by temperature evolution between two predetermined time points when said evolution is greater than the temperature threshold Th5.

The readjustment of the third threshold and the fourth threshold based on the temperature evolution in the fuel tank vapor dome, Th3 and Th4 allows quicker decisions, reduces electrical consumption and increases the occurrence of the decision.

According to a preferred embodiment, the method for detecting a leak in a sealed fuel system of a vehicle according to the invention, is such that said method is started with the temperature evolution measured by a temperature sensor is higher than the temperature threshold Th5.

It is a third object of the invention to provide a method for detecting a malfunctioning of a pressure sensor in a sealed fuel system for a vehicle as defined above.

According to a preferred embodiment of the invention, the method for detecting a malfunctioning of a pressure sensor in a sealed fuel system for a vehicle comprises at least the steps of:
  measuring the pressure P1 in the vapor dome of a tank of the fuel tank at predetermined time points;
  measuring the pressure P2 in the filler pipe of the fuel system or in the venting line of the fuel system above the highest possible liquid level that could be present in the venting line or in the filler pipe at predetermined time points;
  comparing the pressure value P1 in the vapor dome of a tank of the fuel tank and the pressure value P2 in the filler pipe of the fuel system or in the venting line of the fuel system above the highest possible liquid level at the same predetermined time points that could be present in the venting line or in the filler pipe;
  detecting the malfunctioning of a pressure sensor.

The predetermined time points for measuring the pressure in the vapor dome of the fuel tank are preferably 0.5, 2, 3, 6, 8, 10, 12 and 24 hours after the vehicle is key-off.

The embodiments of the present invention are shown on the following figures.

Figure 1:
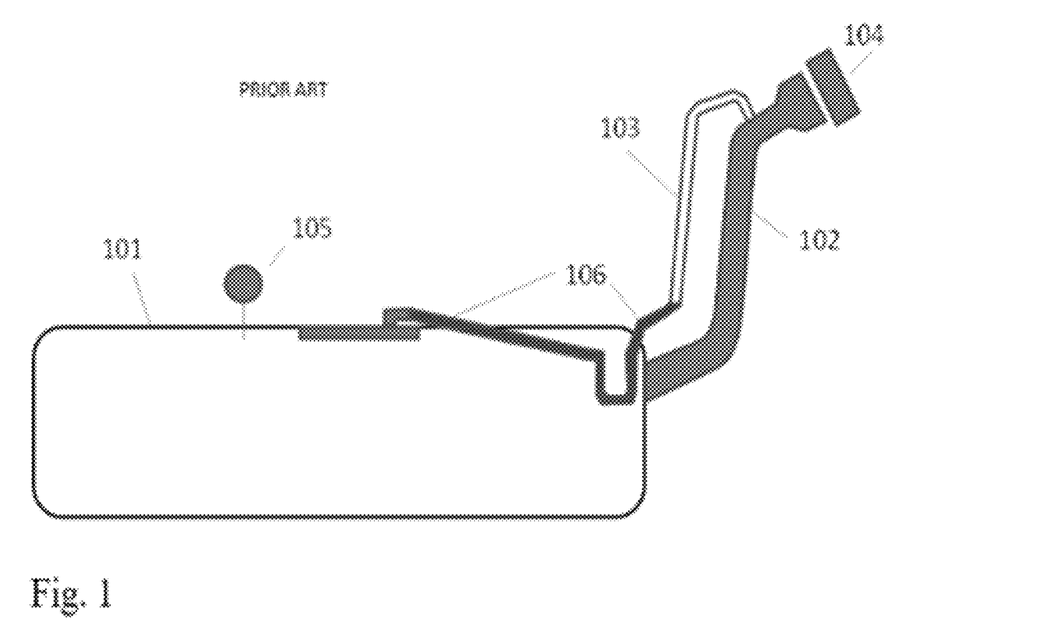
FIG. 1 illustrates a leak detection device according to the prior art installed on a sealed fuel system of a vehicle a venting line for recirculating fuel vapors from the tank to the filler pipe wherein a part of the venting line forms a sump.

FIG. 1 shows a sealed fuel system for a vehicle comprising a leak detection device according to the prior art, the fuel systems comprising a fuel tank 101, with a filler pipe 102, a venting line 103, used to provide vapor communication between the head of the filler pipe 102 and the fuel tank 101, in order to be able detect a leak at the head 104 of said filler pipe 102 primarily induced by the improper replacement of the fuel cap 104. On FIG. 1, there also exists a first pressure sensor 105 on the fuel tank 101 to measure the internal pressure and determine whether or not a leak exists. The figure illustrates also the fact that liquid fuel 106 could be present in the venting line 103 by spilling over from either the refueling process or the tank itself.

Figure 2:
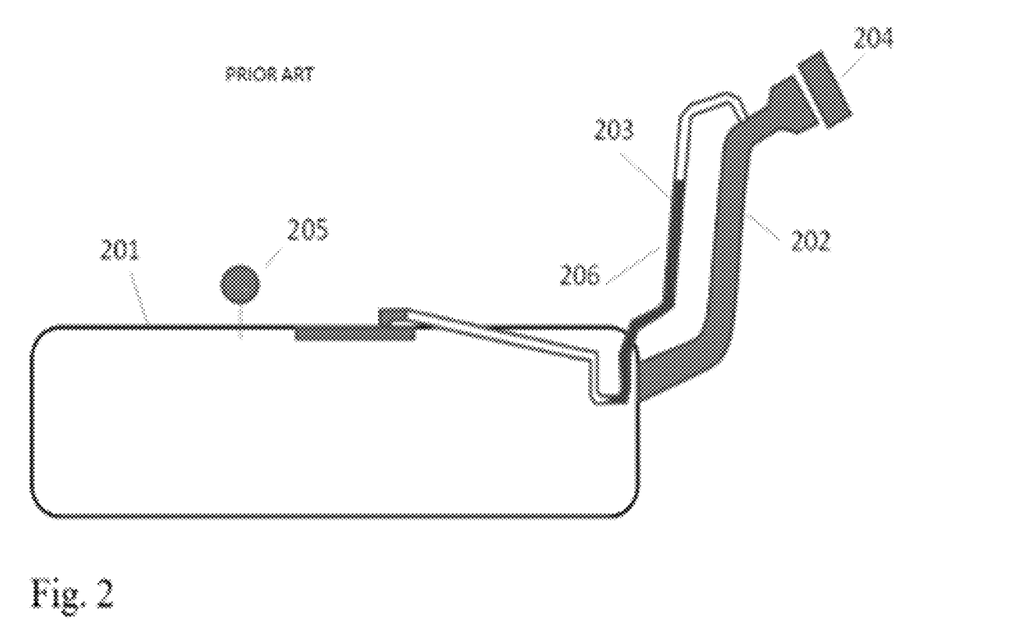
FIG. 2 shows a leak detection device according to the prior art installed on a sealed fuel system of a vehicle a venting line for recirculating fuel vapors from the tank to the filler pipe wherein a part of the venting line forms a sump.

FIG. 2 shows a sealed fuel system for a vehicle comprising a leak detection device according to the prior art, wherein a fuel cap 204 is improperly placed on the head of a fuel filler pipe 202 of the fuel tank 201 and there is liquid fuel 206 in a venting line 203. As a result, an internal tank pressure can be achieved that is higher than the threshold pressure defined to ensure the leak integrity of the fuel system due to the hydrostatic pressure the fluid 206 applies on the fuel tank. As a result, the pressure value measured by a first pressure sensor 205 can falsely indicate that the entire fuel system 201, 202, 203 and 205 is leak tight.

Figure 3:
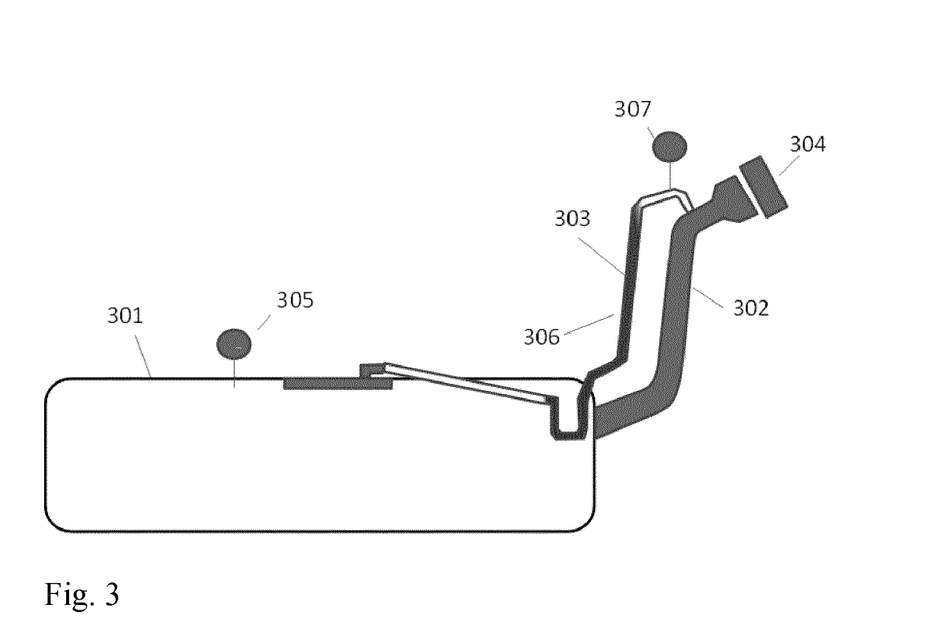
FIG. 3 illustrates a leak detection device according to the invention installed on a sealed fuel system of a vehicle a venting line for recirculating fuel vapors from the tank to the filler pipe wherein a part of the venting line forms a sump.

FIG. 3 represents an embodiment of a leak detection device according to the invention, wherein a fuel cap 304 is improperly placed on the head of a fuel filler pipe 302 and there is liquid fuel 306 in a venting line 303 of a fuel tank 301, and in which a second pressure sensor 307 is implemented in the venting line 303, preferably at a point higher than the highest possible liquid level in the venting line 303. In this embodiment, an absence of pressure will be detected in the venting line 303 and the filler pipe 302, which can be reliably used as criteria to detect a leak, regardless of the liquid fuel 306 inside the venting line 303. By the combination of a first pressure sensor on the fuel tank 305, and the second pressure sensor 307 on the venting line 303 of the leak detection device according to the invention, the complete fuel system 301, 302, 303, 305 and 307 can be checked for leaks. A controller (not shown) controls the operations of the leak detection device. The filler pipe 302 has a sealing means, for example, an Inlet Check Valve (not showed), located near the fuel tank 301. In a preferred embodiment, the Inlet Check Valve is a one-way check valve that is a sealing valve that allows creating a seal between the fuel tank 301 and the filler pipe 302 for preventing pressure built in the fuel tank 301 from being transferred into the filler pipe 302.

Figure 4:
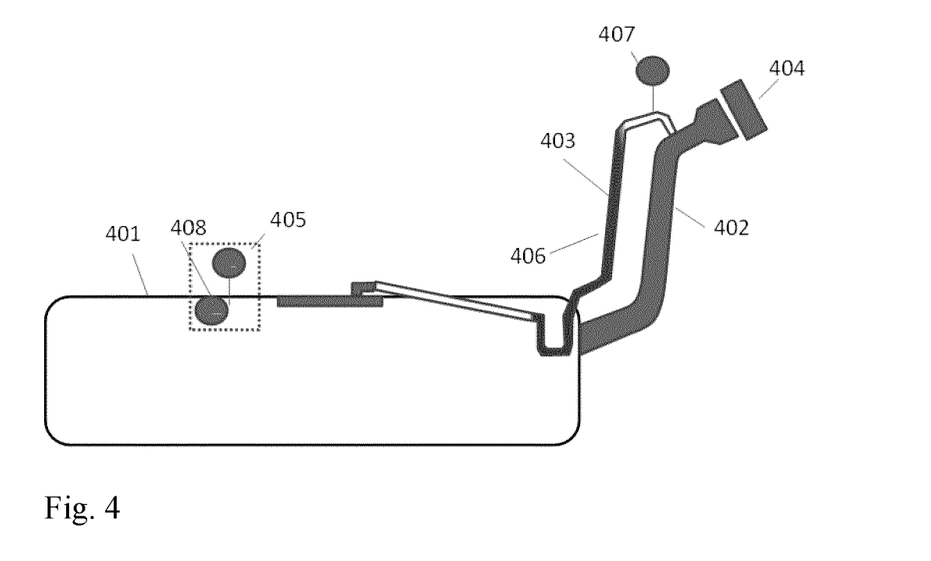
FIG. 4 discloses a leak detection device according to the invention installed on a sealed fuel system of a vehicle a venting line for recirculating fuel vapors from the tank to the filler pipe wherein a part of the venting line forms a sump.

FIG. 4 represents a preferred embodiment of a leak detection device according to the invention, wherein a fuel cap 404 is improperly placed on the head of a fuel filler pipe 402 and there is liquid fuel 406 in a venting line 403 of a fuel tank 401, and in which a second pressure sensor 407 is implemented in the venting line 403, preferably at a point higher than the highest possible liquid level in the venting line 403. In this embodiment, a temperature sensor 408 is integrated into a first pressure sensor 405 in order to more accurately determine whether there was enough temperature change within the fuel tank 401 to build sufficient pressure to determine whether there is a leak in the system or not. This temperature sensor 408 combined with the first pressure sensor 405 in the tank 401 and the second pressure sensor 407 on the venting line 403 represents the ideal system for accurately and consistently detecting a leak in the fuel system. A controller (not shown) controls the operations of the leak detection device. The filler pipe 402 has a sealing means, for example, an Inlet Check Valve (not showed), located near the fuel tank 401. In a preferred embodiment, the Inlet Check Valve is a one-way check valve that is a sealing valve that allows creating a seal between the fuel tank 401 and the filler pipe 402 for preventing pressure built in the fuel tank 401 from being transferred into the filler pipe 402.

Figure 5:
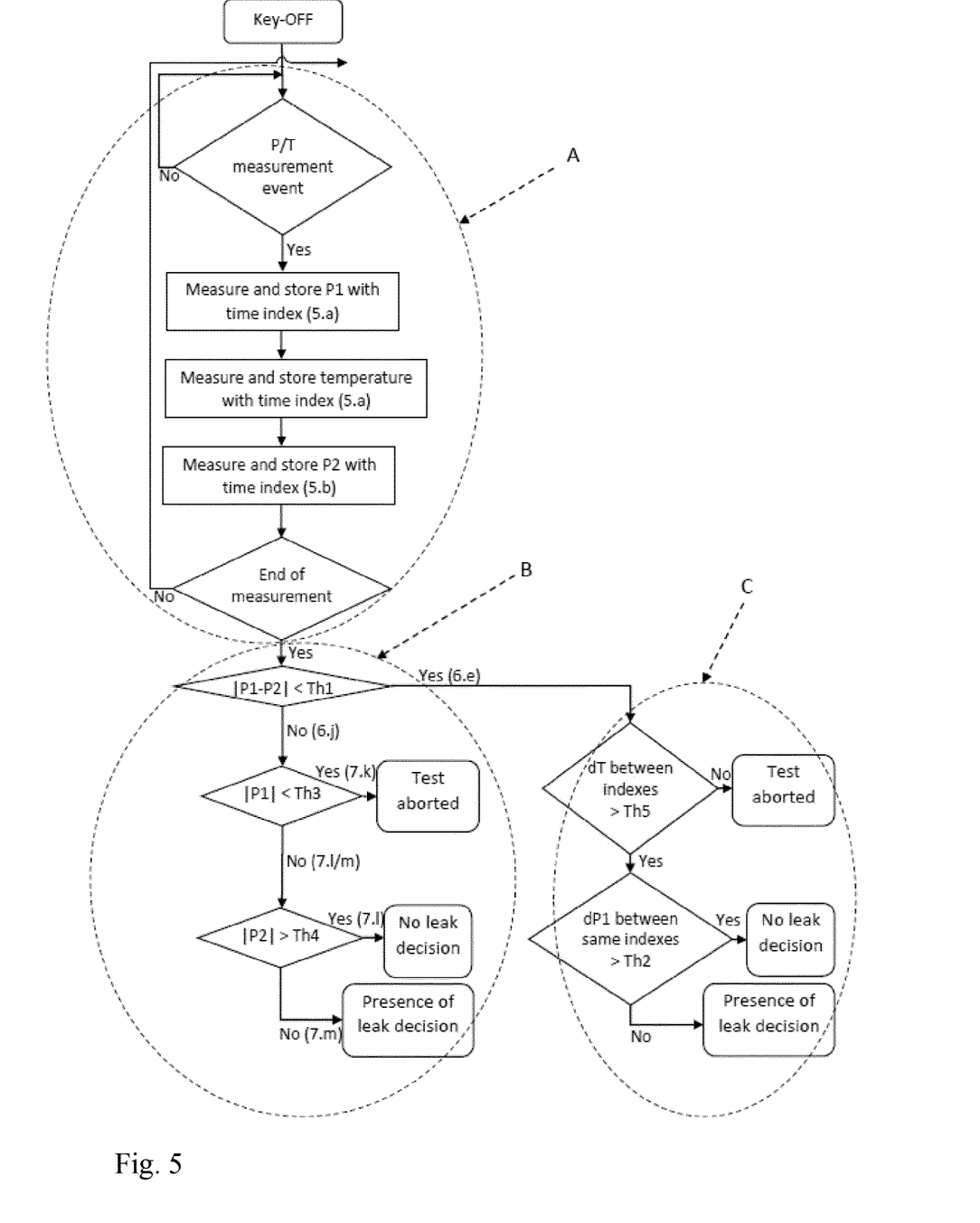
FIG. 5 shows a chart presenting the method for detecting a leak in a sealed fuel system of a vehicle comprising a venting line for recirculating fuel vapors from the tank to the filler pipe wherein a part of the venting line forms a sump.

FIG. 5 represents an embodiment of the method for detecting the leak as well as the integrity of the two pressure sensors comprising the steps of the method, wherein A illustrates the steps a) and b) of the method for detecting a leak in a sealed fuel system of a vehicle, B and C illustrates the steps c) and d) of the method for detecting a leak in a sealed fuel system of a vehicle. More precisely, B illustrates the steps e) of the method for detecting a leak in a sealed fuel system of a vehicle, furthermore B illustrates the steps i), j), k), l) and m) of the method for detecting a leak in a sealed fuel system of a vehicle, and C illustrates the steps f), g) and h) of the method for detecting a leak in a sealed fuel system of a vehicle. For example, as illustrated by B, steps e) and i) form a single comparison step.

LIST OF REFERENCES

101: fuel tank
102: filler pipe
103: venting line
104: fuel cap
105: first pressure sensor
106: liquid fuel
201: fuel tank
202: filler pipe
203: venting line
204: fuel cap
205: first pressure sensor
206: liquid fuel
301: fuel tank
302: filler pipe
303: venting line
304: fuel cap
305: first pressure sensor
306: liquid fuel
307: second pressure sensor
401: fuel tank
402: filler pipe
403: venting line
404: fuel cap
405: first pressure sensor
406: liquid fuel
407: second pressure sensor
408: temperature sensor
A: steps a) and b) of the method for detecting a leak in a sealed fuel system of a vehicle
B: steps e), i), j), k), l) and m) of the method for detecting a leak in a sealed fuel system of a vehicle
C: steps f), g) and h) of the method for detecting a leak in a sealed fuel system of a vehicle

The invention claimed is:

1. A sealed fuel system for a vehicle, comprising:
a fuel tank,
a filler pipe,
a venting line for recirculating fuel vapors from the tank to the filler pipe, and
a leak detection device,
wherein the leak detection device comprises:
a first pressure sensor provided to measure a pressure in a vapor dome of the fuel tank,
a second pressure sensor, and
a controller,
wherein:
the filler pipe has a sealing means located near the fuel tank,
a part of the venting line forms a sump, and
the second pressure sensor is configured to measure a pressure in the venting line above a predetermined maximum threshold after the sump.

2. The sealed fuel system for a vehicle according to claim 1, wherein the sealing means is an Inlet Check Valve.

3. The sealed fuel system for a vehicle according to claim 1, wherein the leak detection device further comprises a temperature sensor to measure a temperature in the vapor dome of the fuel tank.

4. The sealed fuel system for a vehicle according to claim 1, wherein the part of the venting line forming a sump has a shape selected from the group consisting of a U-shape, a V-shape, and a J-shape.

5. A method for detecting a leak in a sealed fuel system of a vehicle comprising a fuel tank, a filler pipe, and a venting line for recirculating fuel vapors from the tank to the filler pipe, wherein a part of the venting line forms a sump, the method comprising:
a) measuring and storing a pressure and a temperature in a vapor dome of a tank of the fuel tank at predetermined time points;
b) measuring a pressure in the venting line of the fuel system above a predetermined maximum threshold after the sump at the predetermined time points;
c) comparing the measured pressure in the vapor dome of a tank of the fuel tank and the measured pressure in the venting line of the fuel system above the predetermined maximum threshold after the sump at a same predetermined time point; and
d) detecting a leak using a result obtained in step c).

6. The method for detecting a leak in a sealed fuel system of a vehicle according to claim 5, wherein steps c) and d) comprise:
e) comparing an absolute value of a difference between the two measured pressures to a first threshold;
f) when the absolute value of the difference is lower than the first threshold, comparing the measured temperatures and the measured pressures in the vapor dome of the fuel tank measured at the predetermined time points;
g) when a difference of the temperatures measured at a first time and at a second later time is higher than a temperature threshold, calculating a pressure expected in the fuel system at the second time, based on a temperature evolution measured between the first time and the second time and the pressure obtained at the first time, and a coefficient that represents a natural evolution of pressure in the fuel system over time; and
h) detecting a leak by comparing the calculated expected pressure and the pressure obtained at the second time to at least one predetermined second threshold.

7. The method for detecting a leak in a sealed fuel system of a vehicle according to claim 5, wherein steps c) and d) comprise:
i) comparing an absolute value of a difference between the two measured pressures to a first threshold;
j) when the absolute value of the difference is higher than the first threshold, comparing an absolute value of the pressure in the vapor dome of a tank of the fuel system to a third threshold and comparing an absolute value of the pressure in the venting line of the fuel system above the predetermined maximum threshold after the sump to a fourth threshold;
k) when the absolute value of the pressure in the vapor dome of a tank of the fuel system is lower than the third threshold, concluding an impossibility to detect a leak;

l) When the absolute value of the pressure in the venting line of the fuel system above the predetermined maximum threshold after the sump is higher than the fourth threshold (Th4), concluding the fuel system is leak tight; and m) when the absolute value of the pressure in the venting line of the fuel system above the predetermined maximum threshold after the sump is lower than the fourth threshold, concluding the fuel system has a leak.

8. The method for detecting a leak in a sealed fuel system of a vehicle according to claim 6, wherein the first threshold is defined based on a precision and an accuracy of:
   a first pressure sensor configured to measure the pressure in the vapor dome of the fuel tank, and
   a second pressure sensor configured to measure the pressure in the venting line above the predetermined maximum threshold after the sump.

9. The method for detecting a leak in a sealed fuel system of a vehicle according to claim 6, wherein the second threshold is chosen in a range of 5 mbar and 35 mbar, and the temperature threshold is chosen between 1° C. and 5° C.

10. The method for detecting a leak in a sealed fuel system of a vehicle according to claim 7, wherein the third threshold is adapted to a potential maximum hydraulic pressure of the liquid in the sump of the venting line as a function of a sign of a value of the pressure in the vapor dome.

11. The method for detecting a leak in a sealed fuel system of a vehicle according to claim 7, wherein the fourth threshold is defined based on an accuracy and a precision of a pressure sensor configured to measure the pressure in the venting line above the predetermined maximum threshold after the sump, the pressure sensor being located in the filler pipe above the the predetermined maximum threshold after the sump.

12. The method for detecting a leak in a sealed fuel system of a vehicle according to claim 7, wherein the third threshold and the fourth threshold are augmented by a temperature evolution between two predetermined time points when the temperature evolution is greater than the temperature threshold.

13. The method for detecting a leak in a sealed fuel system of a vehicle according to claim 6, wherein the method is started when a temperature evolution measured by a temperature sensor is higher than the temperature threshold.

14. A method for detecting a malfunctioning of a pressure sensor in a sealed fuel system for a vehicle according to claim 1, wherein the method comprises:
   measuring a pressure in the vapor dome of a tank of the fuel tank at predetermined time points;
   measuring a pressure in the venting line of the fuel system above the predetermined maximum threshold after the sump at the predetermined time points;
   comparing the pressure value in the vapor dome of a tank of the fuel tank and the pressure value (P2) in the filler pipe of the fuel system or in the venting line of the fuel system above the predetermined maximum threshold after the sump; and
   detecting the malfunctioning of a pressure sensor selected from the first pressure sensor and the second pressure sensor.

15. The method for detecting a leak in a sealed fuel system of a vehicle according to claim 9, wherein the temperature threshold is chosen between 2° C. and 3° C.

* * * * *